United States Patent [19]

Roper et al.

[11] Patent Number: 4,724,935
[45] Date of Patent: Feb. 16, 1988

[54] ANTILOCK BRAKE SYSTEM WITH WHEEL SPEED SENSOR

[75] Inventors: Daniel W. Roper, Rochester; Dennis A. Kramer, Troy; Mark Malinowski, Farmington Hills, all of Mich.

[73] Assignee: Rockwell International Corporation, Pittsburgh, Pa.

[21] Appl. No.: 916,139

[22] Filed: Oct. 7, 1986

[51] Int. Cl.[4] .............................................. B60T 8/32
[52] U.S. Cl. ................................... 188/181 R; 73/493; 74/710.5; 74/DIG. 7; 180/244; 303/110; 310/168
[58] Field of Search ............. 303/91, 93, 94–99, 303/100, 102–103, 110, 68–69, 106, 113, 119; 188/181 A, 181 R, 181 C, 1.11; 74/710.5, 711, DIG. 7; 180/244, 197; 310/168, 67 R, 261, 155; 73/518, 493, 532

[56] References Cited

U.S. PATENT DOCUMENTS

| | | | |
|---|---|---|---|
| 3,684,047 | 8/1972 | Zeisloft et al. | 188/181 R X |
| 3,769,533 | 10/1973 | Pauwels | 188/181 R X |
| 3,829,166 | 8/1974 | Menar et al. | 188/181 A X |
| 3,949,841 | 4/1976 | Jovick et al. | 188/181 R |
| 4,263,824 | 4/1981 | Mueller | 74/711 |
| 4,552,241 | 11/1985 | Suzuki | 180/197 X |

Primary Examiner—Douglas C. Butler

[57] ABSTRACT

The present invention contemplates a preferred position for mounting an antilock control system that uses a single wheel speed sensor. The wheel speed sensor is mounted to sense speed of rotation of the main differential gear in a differential gear assembly and generates a wheel speed signal indicative of the average rate of rotation of at least two wheels of the vehicle. The sensing point is beyond the final reduction in gear ratios so as to eliminate any need to accommodate different axle ratios. The preferred mounting position also reduces velocity fluctuations caused by oscillations of the truck driveline. A microprocessor controller is mounted in close proximity to the wheel speed sensor so as to minimize the length of sensor leads and, hence, the susceptibility of the antilock controller to electromagnetic interference. In the preferred embodiment, a single wheel speed sensor on one axle of a truck controls a solenoid valve that releases braking force from all the drive wheels of the vehicle in response to the wheel speed signal. Alternately, an antilock controller may be used on each axle and control only the brakes of that axle so as to provide axle-by-axle braking control.

10 Claims, 7 Drawing Figures

ANTILOCK BRAKE SYSTEM WITH WHEEL SPEED SENSOR

1. Field of the Invention

This invention relates to apparatus for reliably preventing a brake system from locking a wheel or wheel set of a vehicle, particularly a truck, so as to maintain limited rolling motion of the wheel or wheels and maximize directionally controlled deceleration of the vehicle on surfaces having varying frictional characteristics.

2. Description of related art.

For reasons of mechanical stability and extended operational life, it is desirable to mount a sensor for an antilock brake system away from the wheels of the vehicle such as at the differential gear case. A sensor mounted at the differential gear case is less sensitive to various disadvantages such as exposure to contamination, vibration, oscillation of the speed of the drive system, variations in input speed ratios, etc. A sensor mounted in a remote position, however, is less sensitive to changes in the speed of rotation of the wheel than a sensor mounted on or near the wheels. A high degree of sensor sensitivity was required because conventional antilock signal processing devices were relatively slow to respond to changing road conditions. For example, analog devices typically represented the speed of the vehicle by the charge stored on a charge storage capacitor and measured the deceleration of the vehicle by the rate at which charge was removed from the capacitor. Their response time was limited by the time required to discharge the storage capacitor through a resistor.

Digital signal processors are generally faster in responding to changing road conditions than analog devices. The extent, if any, to which sensitivity must be comprised to obtain a better mechanical positioning of the speed sensor has not been explored. Further, the prior art does not suggest solutions for mounting wheel speed sensors for truck axles, particularly tandem axle arrangements.

SUMMARY OF THE INVENTION

The present invention contemplates a preferred position for mounting an antilock control system that uses a single wheel speed sensor to sense wheel speed at the main differential gear. The wheel speed sensor thus senses the average speed of rotation of a set of wheels, particularly for a truck vehicle. The sensor is positioned beyond the final reduction in gear ratios so as to eliminate any need to accommodate different axle ratios in the software programming. A microprocessor controller is mounted in close proximity to the wheel speed sensor so as to minimize the length of sensor leads and, hence, the susceptibility of the antilock controller to electromagnetic interference. A solenoid valve controls four brake chambers which control the amount of braking force applied to the wheels. Alternately, an antilock controller may be used on each axle and control only the brakes of that axle so as to provide axle-by-axle control of a vehicle. The time required for the antilock controller to respond to a change in wheel speed is as little as 20 milliseconds. The preferred positioning of the present invention has been found to be be more accurate because oscillations of the carrier are not as easily sensed. Further, only two wheels are sensed rather than four which produces more accurate measurement of instantaneous wheel speed.

DETAILED DESCRIPTION OF THE PREFERRED EMBODIMENT

Figure 1:
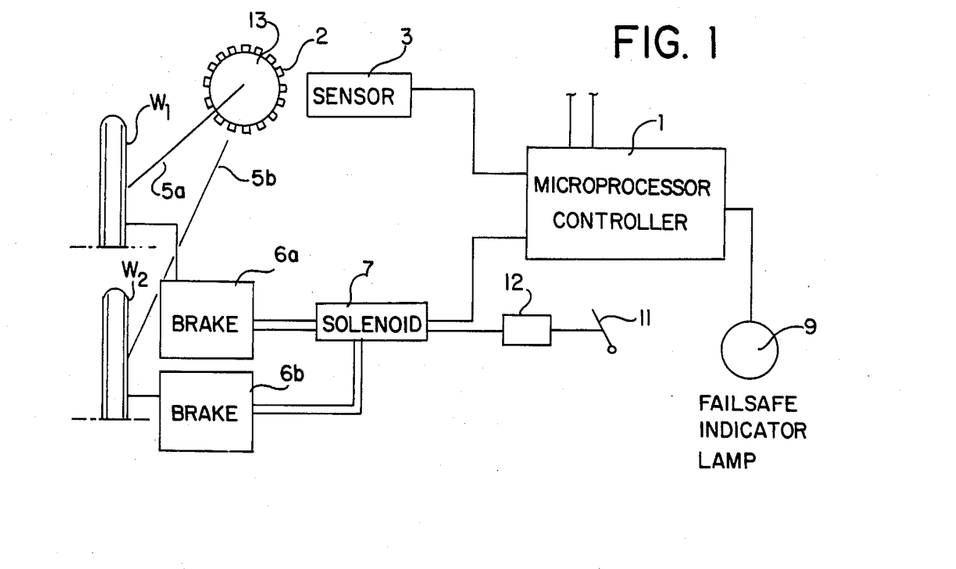
FIG. 1 illustrates an antilock wheel brake control system in accordance with the present invention.

With reference to FIG. 1, a representative antilock brake control system for vehicle wheels W1, W2 includes an antilock controller in the form of microprocessor controller 1 that receives a signal indicating the passage of magnetic elements 2 from a conventional magnetic reluctance speed sensor 3 along appropriate lead lines. The magnetic elements comprises 100-120 equally spaced elements specially provided on the gear for measuring rotation. The elements may be bolted onto the differential gear or formed integral therewith. The main differential gear rotates at a rate indicative of the average rate of rotation of a axles 5a and 5b. Brakes 6a and 6b control the application of braking force to wheels W1 and W2 in accordance with the operative state of solenoid valve 7. The braking system, of course, includes an operator controlled brake applying element such as a pedal 11 and an appropriate control valve or master cylinder 12 for converting the motion of pedal 11 into braking force. A failsafe indicator lamp 9 is provided at a point in the system visible to a vehicle operator and is controlled by the microprocessor 1 to indicate any failure in the antilock system.

LOCATION OF THE ANTILOCK SENSOR

Figure 2:
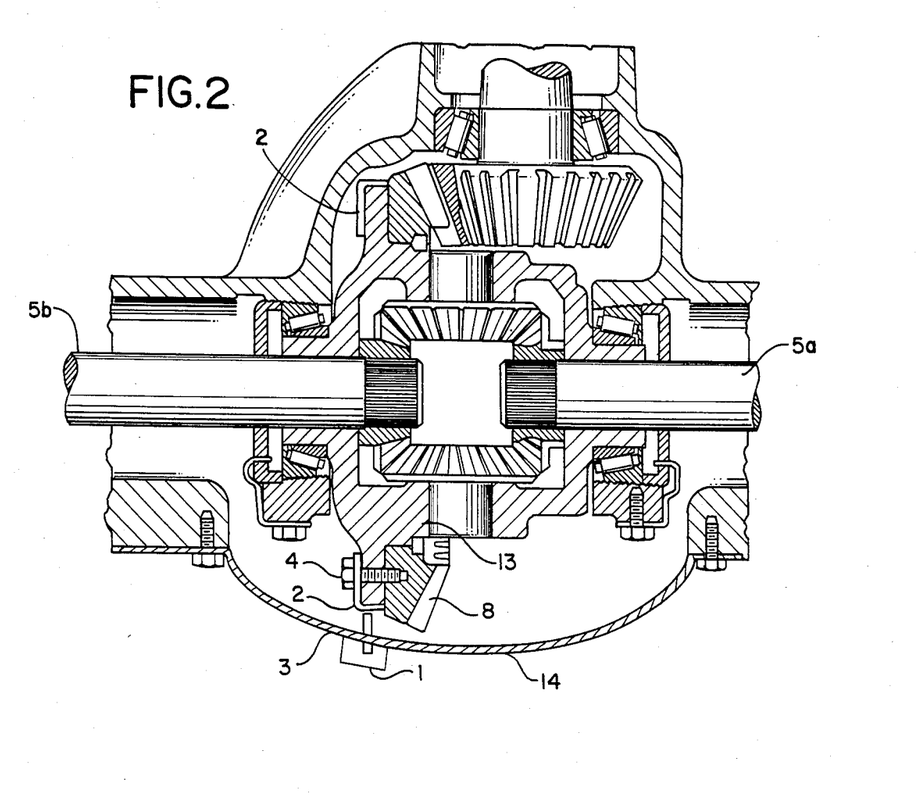
FIG. 2 schematically illustrates the preferred positioning of the wheel speed sensor of the present invention.

As shown in FIG. 2, speed sensor 3 is positioned closely adjacent microprocessor 1 to reduce the length of the lead wires connecting the sensor to the microprocessor so as to reduce the effects of any stray radio frequency electromagnetic interference. Sensor 3 detects the passage of magnetic elements 2. FIG. 2 shows the magnetic elements retrofitted with bolt 4 onto the carrier 13 for main differential gear 8. The exact positioning of the elements, however, may change considerably, and the elements may be formed integral with either the carrier or differential gear. The differential gear shown in FIG. 2 is well known in the art and may also advantageously comprise the differential gearing for a tandem drive axle for a truck of a type also well known in the art.

Both microprocessor 1 and speed sensor 3 are mounted to the axle housing of the main differential case 14 so as to isolate the antilock system from most roadway shocks and common environmental hazards such as dirt and salt deposits thrown up by the wheels of the vehicle. The positioning of the antilock system according to the present invention has the advantage that variations in axle speed ratios do not change the wheel speed signal because the rate of rotation of the main differential gear always corresponds to the average speed of rotation of wheel axles 5a and 5b. Further, it has been found that the speed signal generated by the wheel speed sensor at the main differential gear is less susceptible to false variations in the velocity of the vehicle than that signal obtained by positioning the sensor elsewhere on the drive train such as at the input drive shaft.

The preferred positioning of the speed sensor according to the present invention has several advantages. The preferred positioning of the speed sensor permits the antilock controller to sense the average speed of only two wheels rather than for four or more wheels. Measuring the rotational rate of only two wheels increased the sensitivity to a single wheel deceleration. The sensing point is beyond the point of the final reduction of the gear ratio so that the wheel speed sensor directly measures the speed of rotation of the wheel or wheels connected to the wheel drive axle. Thus, the same antilock system may be used on different axles. Finally, the preferred positioning of the antilock system is less sensitive to high frequency mechanical vibrations of the vehicle commonly encountered in driving over rough road. High frequency vibrations are picked up by the wheel speed sensor as changes in wheel speed an form a major limitation to the accuracy of a digital antilock system. Reducing the mechanical oscillations increases the accuracy of the digital antilock system.

The antilock control of the present invention may be placed at either the main differential gear of a tandem axle or at the rear differential, or the main differential of a single drive axle vehicle. Thus, the preferred embodiment of the present invention simplifies the design of the antilock system since the same system may be used on different vehicles. The selection of which wheel set to average is based on the type of vehicle on which the present invention is used. Thus, only one antilock controller must be used to control a truck tractor. The preferred positioning of a sensor for the cab of a conventional eighteen wheel tractor-trailer comprises one sensor on one of the differential gears of the tandem drive axle. The controller is mounted on the same axle as the sensor. A single solenoid valve is connected by appropriate lead lines to the controller to release the braking force from all the wheels on the cab. In addition, or in the alternative, the antilock control system of the present invention may be installed on more than one axle of the vehicle so as to provide axle-by-axle control of braking.

THE ANTILOCK CONTROL SYSTEM

So as to provide a more fully enabling disclosure of the present invention, set forth below is a detailed description of an antilock control system suitable for use with the present invention.

Figure 3A:
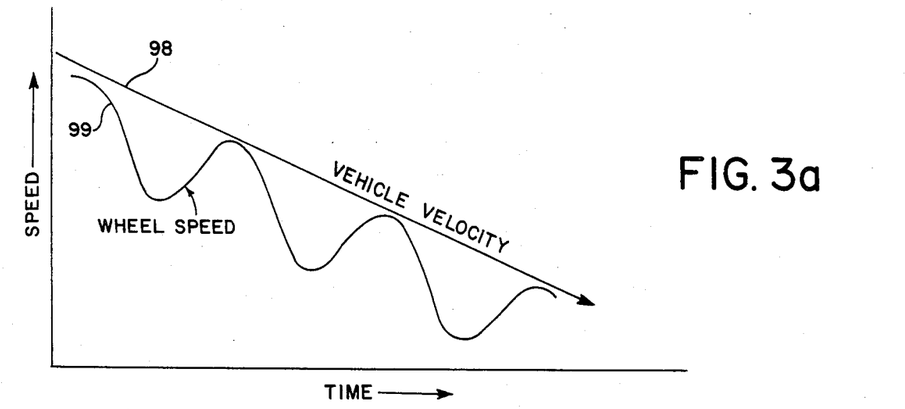
FIG. 3a and 3b respectively illustrate representative wheel speed signal curves intended to diagrammatically illustrate the principle of operation of an antilock controller that may be used by the present invention.

With reference to FIG. 3a, an ideal plot of vehicle velocity versus time is shown as curve 98, indicating a linear speed decay of the vehicle upon application of maximum brake force to the vehicle wheels. Curve 99 indicates ideal wheel speed signal versus time using a typical antilock system. In the antilock system of the present invention, application and release, or modulation, of brake force causes periodic decrement and increment of wheel speed signal, respectively. The antilock system attempts to modulate the braking force so that the wheel always rotates at a speed less than a speed corresponding to the speed of the vehicle, thus ensuring that the brakes always apply at least some braking force to the wheels. An antilock system may not be able to obtain this ideal in all instances, such as the first time that a pneumatic brake locks. However, even in extreme cases, the antilock system can attempt to optimize the modulation of the braking force so as to control the variation in the actual speed of the wheel between the two extremes and maximize the frictional force which the wheels exert against the road. Various formulae are known in the art are available to those skilled in the art providing a correlation between maximum speed of wheel rotation and vehicle velocity to achieve minimum stopping distances for the vehicle. assuming for simplicity that the decay in the velocity of the vehicle is linear within the range of operation of the antilock system.

Figure 3B:
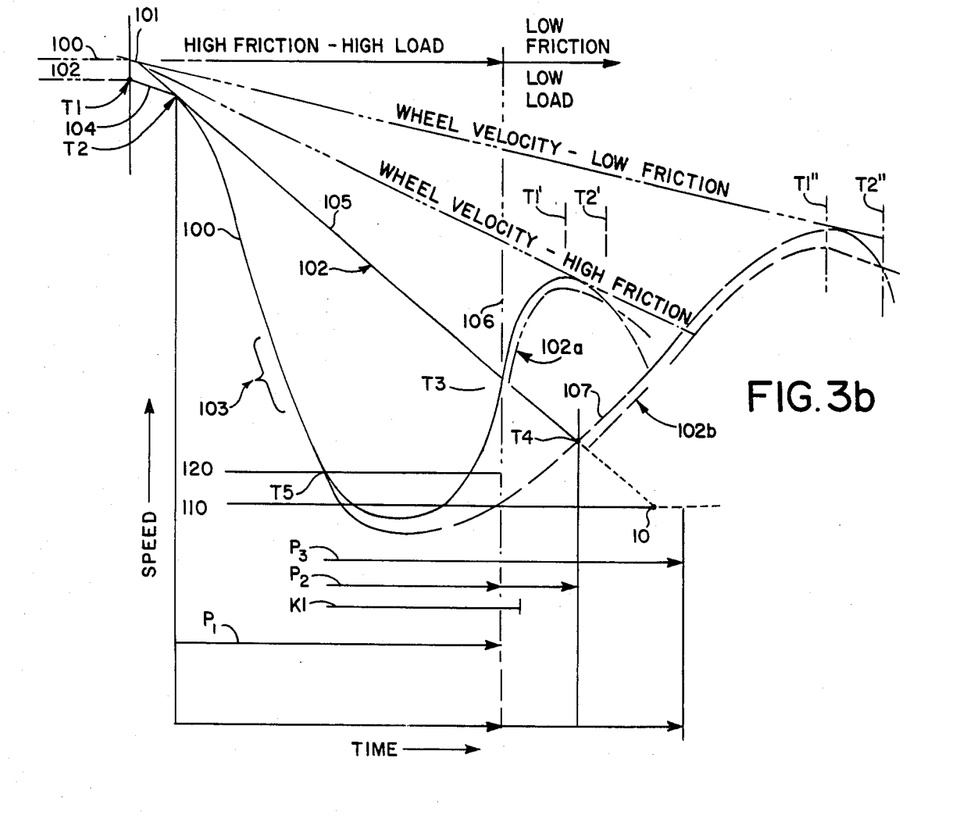

Referring now to FIG. 3b, a series of curves is shown to illustrate the operational principle of an antilock system. The vertical axis corresponds to the value of a digitized input wheel speed signal, while the horizontal axis corresponds to a time interval corresponding to the occurrence of the digitized speed signal. Curve 100 represents the plot of actual values of a digital speed input signal corresponding to the rotational speed of a braked wheel W under conditions of incipient wheel lock-up due to the inability of the contact surface engaging the wheel to resist frictional sliding motion of the wheel. It will be observed that, to the left of time T1, the wheel speed signal is a constant or is decreasing at a permissible rate of decrement. However, upon the application of braking force to the wheel exceeding that which the wheel can sustain for the surface over which it is moving, the speed of the wheel begins to decrement at an increasing rate as shown at 101. Assuming that a lock-up condition is about to occur, the wheel speed signal rapidly decays at a very steep rate of decrement as shown along portion 103 of curve 100.

Digitized input wheel signals 100 are supplied as inputs to microprocessor controller 1 where they are periodically sampled at a frequent rate to detect their values and the rate of change of same. Within the microprocessor, a digitized reference signal 102 is generated that corresponds to a predetermined fraction less than unity of the input speed signal 100. The reference signal 102 is constantly generated during the input of speed signal 100 and is appropriately adjusted in value as the speed signal varies.

If wheel speed signal 100 decrements too rapidly, the wheel speed signal exceeds a predetermined permitted rate of speed decrement as shown at 101 of curve 100. Beginning at time T1, the microprocessor, which is constantly sampling the speed signal 100, adjusts the value of the reference signal 102 so that it begins to decrement at a constant first maximum rate of decrement as shown at 104. The first maximum rate of decrement of the reference signal 102 corresponds to a predetermined rate of deceleration that has been selected to correspond to a speed deceleration rate of approximately 0.7 g or 22.4 ft/sec$^2$ (where g represents the acceleration of gravity).

If the rate of decrement of the wheel signal continues to exceed the first maximum rate of reference signal decrement 104, it will eventually correspond with and drop below the value of the reference signal at time T2. The microprocessor, continuously comparing the values of the speed and reference signals, detects this occurrence at time T2 and determines at this point that incipient lock-up of the wheel W is in progress. After two iterations indicating the crossover, the microprocessor controller generates a brake release signal to solenoid 7 to cause release of brake force tending to cause the lock-up condition.

At time T2, the microprocessor further adjusts the reference signal 102 to decrement at a second, greater, maximum rate of reference signal decrement as shown at 105 on curve 102. The steeper rate of decrement corresponds to a maximum deceleration rate of, for example 1.0 g (32 ft/sec$^2$). This decrement rate may be thought of as a fictitious approximation of the deceleration of the vehicle during a skid situation. Presuming a greater rate of vehicle deceleration in a skid situation is obviously not a realistic assumption. However, the brakes of the vehicle do not respond immediately to the commands of the antilock system. Thus, the antilock control system must anticipate future conditions to the extent necessary for the brake force control commands to reach the brake at an appropriate time. The greater rate of signal decrement may be thought of as produced by dividing the anticipated speed of the vehicle during the skid cycle by a time period corresponding to the actual time that the vehicle is in the skid cycle less a period of time corresponding to the combined time required for the brake release command to travel from the solenoid valve to the brake and the delay times inherent in operating the solenoid valve and brake.

It is to be appreciated that a greater rate of reference signal decrement compensates for delays produced in computing the control functions for the antilock system. The fictitious rate of decrement to compensate only for the mechanical delays of the system, primarily the delay time required for the brake system to respond to the antilock control signals, and not for the time required for the antilock system to compute the control commands. Also, the magnitude of the second rate of reference speed decrement illustrated results from the antilock system being applied to a pneumatic brake system. Pneumatic brake systems require a longer period of time to respond to the brake release and reapply commands because of the greater period of time required for a pressure wave to travel through the compressible fluid present in a pneumatic brake line. The second rate of decrement of the signal would be less, i.e. closer to the actual deceleration of the vehicle, if the pneumatic brake system were replaced with an hydraulic brake system because the commands to the brake can travel faster through the noncompressible fluid present in an hydraulic line. The response of the vehicle also may depend on the type of brake force release means and the type of brake used in the vehicle. Thus, the rate of decrement of curve 102 is selected in accordance with the type of brake system and, to a lesser extent, the type or class of vehicle.

During the time that the value of the speed signal 100 is below the value of the reference signal during its second rate of decrement as shown along portion 105 of curve 102, the microprocessor continously compares the relationship between the speed and reference signals while monitoring the time elapsed from point T2. Eventually, depending upon wheel loading and the frictional characteristics of the surface over which the wheel is moving, the wheel speed signal begins to increase upon the release of brake force under the control of the microprocessor until at time T3, the value of the speed signal once again corresponds with the value of the reference signal 102 and begins to go above the reference signal as shown at 106. The release of the brake release signal occurs at the second time that the wheel speed signal crosses the reference velocity curve, whereas the reference speed signal does not resume its original relationship to the speed signal until a time after time T3 when the wheel speed signal reaches a value such that the value of the reference curve equals a predetermined fraction less than unity of the value of the speed signal, i.e. the microprocessor restores the original reference signal to the speed signal relationship that existed before time T1 so that the reference signal 102 again tracks the speed signal now depicted as section 106 of curve 100 at the previous fraction less than unity of the speed signal. In no event, however, does the speed signal go below the second minimum speed threshold 110 as indicated by point 10 in FIG. 3b.

Assuming that the braking force continues to exceed that which can be absorbed by the rotating wheel against the surface over which it is moving, the wheel speed signal again will begin to decrement at time T1' and the conditions that previously occurred at time T1 will again be detected by the microprocessor. The microprocessor will thereupon adjust the reference signal once again in a manner similar to that depicted at part 104 of curve 102 as the wheel speed signal continues to decay towards a lock-up condition. The entire process described above is therefore repeated until the wheel speed signal drops below a predetermined threshold, for example 10 ft/sec at which speed the controller is programmed to not turn on the solenoid.

The value of the reference signal 102 is normally maintained at 0.9 of the value of the speed signal 100 until the conditions at time T1, T1' . . . are detected. This relationship is shown in FIG. 3b to the left of time T1 and is shown by curve 102a to the right of time T3 up to time T1'.

The microprocessor controller will not generate an antilock brake force release signal if the actual wheel speed drops below a first predetermined minimum threshold speed, for example 10 ft/sec. This avoids operation of the antilock system at low wheel velocity, which could increase the vehicle stopping distance. However, the microprocessor must not cancel the antilock brake release signal if the wheel speed signal drops below a second minimum threshold speed as a result of the brake applying excessive braking force to the wheel. Accordingly, the microprocessor controller does not cancel the brake release signal while the wheel speed signal 100 is below said second predetermined threshold indicative of an actual wheel speed less than the minimum threshold speed. The value of reference curve 102 is never less than a value corresponding to second threshold 110.

The control algorithm, in addition to inhibiting release of the solenoid valve when the wheel speed signal drops below minimum threshold 110, does not engage the solenoid valve unless the value of the wheel speed signal exceeds first minimum threshold 120. Experiment has shown that the braking characteristics of a vehicle may vary greatly at slow vehicle velocities. The present system does not offer a substantial improvement over the results obtained by retaining control with the operator of the vehicle at vehicle velocities below approximately 10 ft/sec as represented by second threshold 120. The antilock controller therefore does not attempt to regulate the application of braking force in these low velocity situations.

If the wheel speed signal drops below the minimum threshold velocity 110 during a brake control cycle, it is possible that, under certain conditions, the microprocessor may generate a brake force release signal when the wheel speed signal does not cross the reference signal 102 along part 105 of a plot of its value. The microprocessor might not adjust to the situation since it is waiting for the conditions at time T3 or T4 to occur, that is, a correspondence of the speed signal with the reference signal and a crossing over thereby so that the speed signal exceeds the reference signal. Maintenace of the brake force release signal under such conditions would be detrimental and could increase the stopping distance of the vehicle. Accordingly, the control system includes a program within the microprocessor whereby, if the period of time P1 elapsed from time T2 exceeds a predetermined maximum elapsed time, the brake force release signal is cancelled to restore full brake control to the operator of the vehicle. For example, a maximum period of 2.5 seconds elapsed time has been found to be appropriate. If the software does not turn off the solenoid, however, the hardware will disable the entire antilock system after a longer elapsed time such as 4 seconds.

The control algorithm compensates for various road surface frictional characteristics as a function of the wheel speed signal 100 and, in particular, the time required for the actual rate of rotation of the wheel from which braking force has been released to increase its rate of rotation so that the wheel speed signal corresponds to the value of the reference signal along part 105 of curve 102. If the wheel is being braked on a low friction surface, a greater period of time is required for the wheel speed signal to correspond to reference signal 102 as the wheel speed signal increments along part 107 during the time elapsed from time T2. The microprocessor measures a time period P2 from the time when the wheel speed signal first decrements below a minimum threshold speed 120 at elapsed time T5 until the wheel speed signal corresponds with reference signal 102 at, for example, time T4. The control algorithm of the microprocessor accesses a value for a time constant K corresponding to the time required for the wheel speed signal to correspond to the value of reference curve 102 along curve 105. The value of K is an empirically derived experimental result. The value for K is related to the speed of the vehicle determined from the speed of the wheel at time T2 when the value of the wheel speed signal initially drops below the value of the reference signal 102. The value of K depends on the initial wheel velocity at time T2 is as follows:

| Wheel Velocity (ft/sec) | K (sec) |
|---|---|
| 44 | .5 |
| 22 to 44 | .4 |
| 22 | .3 |

If time period P2 exceeds the applicable period of time K, the microprocessor detects a low friction/low load condition at the wheel and extends the brake release signal until expiration of time period P3. P3 exceeds P2 by two times the amount that P2 exceeds K.

Figure 4A:
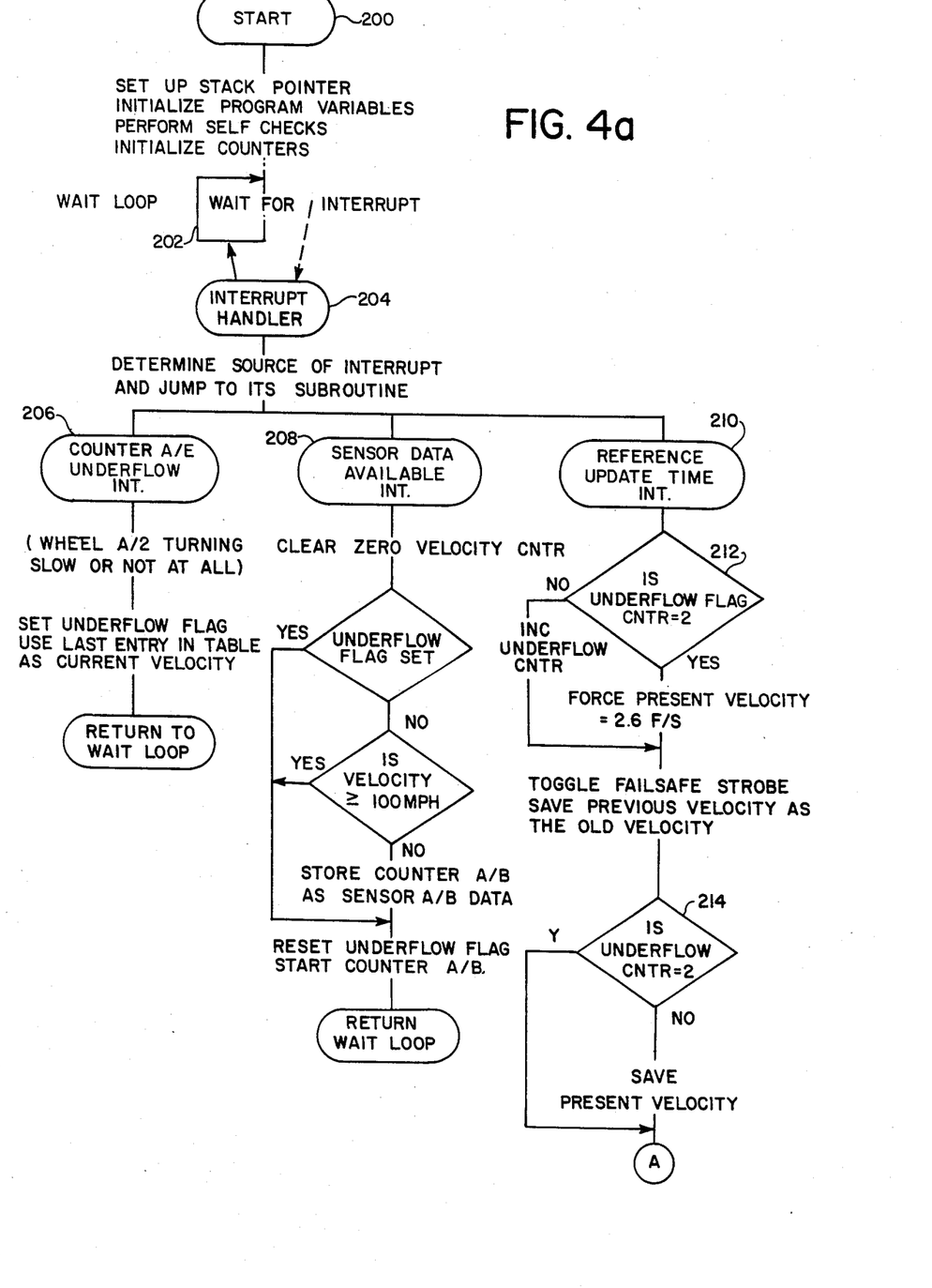
FIG. 4a, 4b and 4c comprise a flow chart of the program stored in the antilock controller used in the present invention to generate brake release signals in accordance with detected wheel lock-up conditions.
Figure 4B:
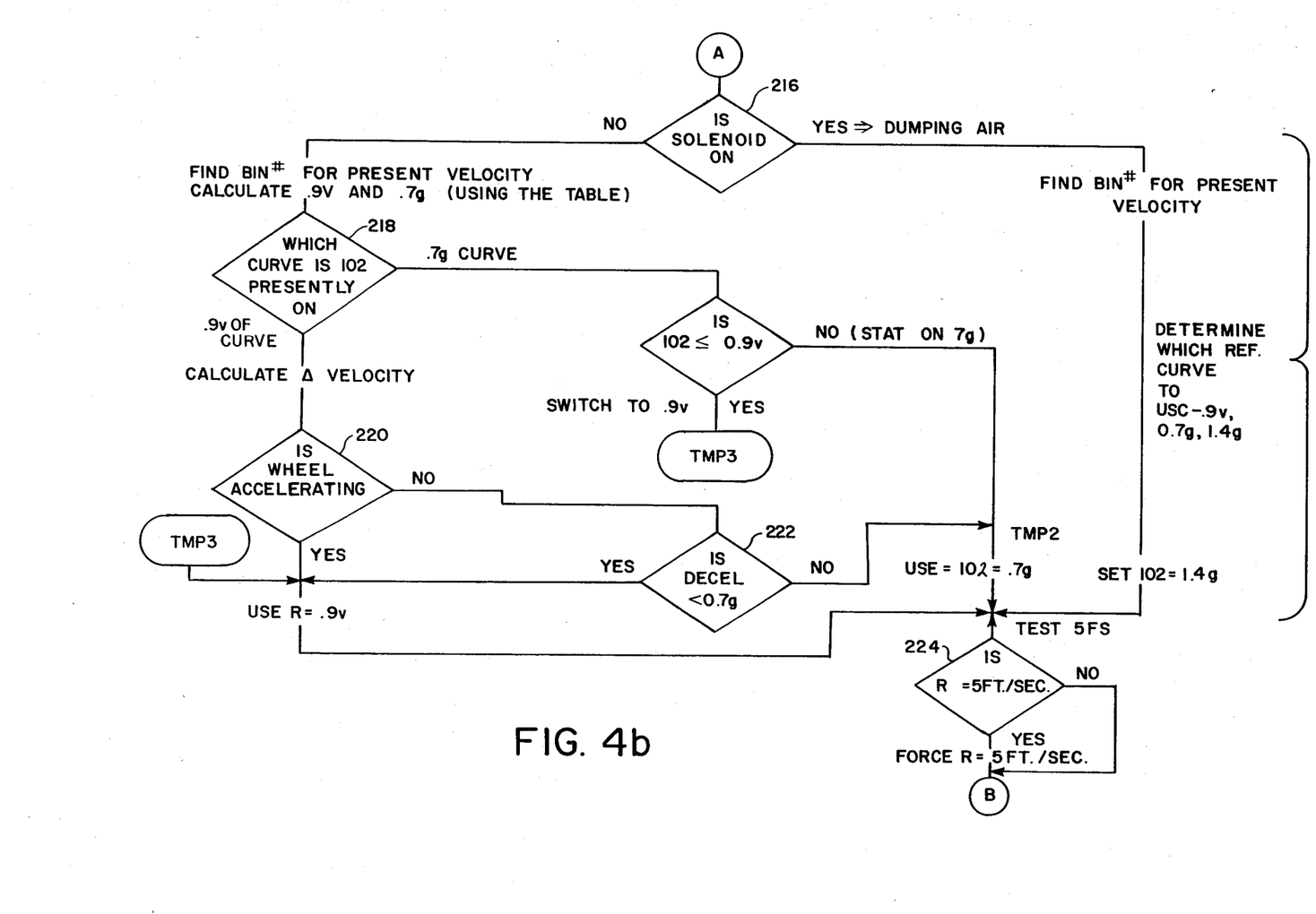
Figure 4C:
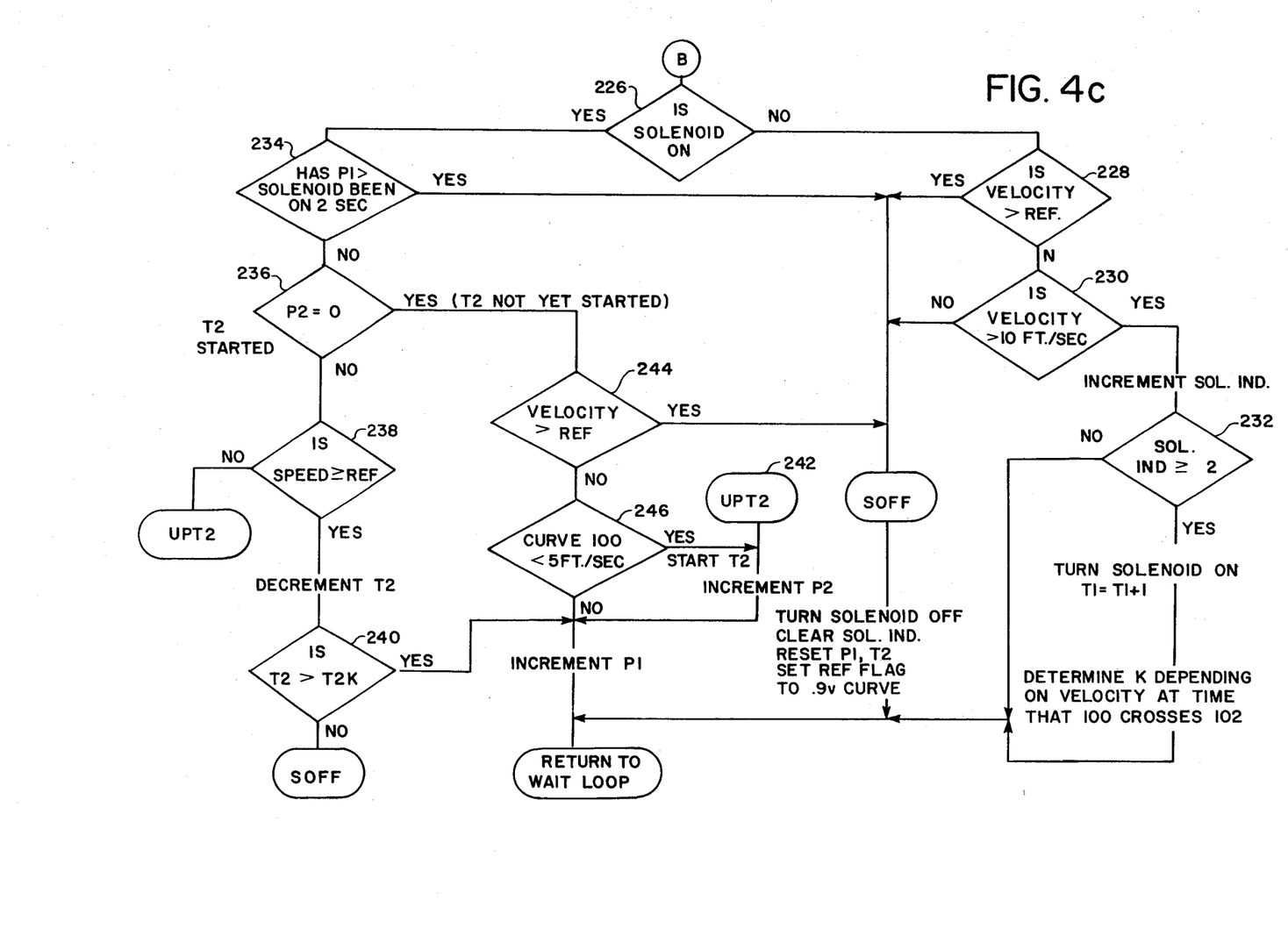

The foregoing general discussion may be further understood with reference to FIGS. 4a, 4b, and 4c showing flow charts of one software embodiment of the systems algorithms. The systems algorithm begins when the system first receives power. The microprocessor controller 1 performs a series of self checks and initializes program variables and counters. The systems algorithm first determines the source of the interrupt. FIG. 4a shows, beginning at a point 200, the time the operator triggers the ignition of the vehicle. The controller performs an initialization routine and then puts the system algorithm into wait loop 202. The system algorithm exits the wait loop at periodic intervals corresponding to the reception of an interrupt signal at 204 and engages a control algorithm only upon the receipt of an interrupt signal which the controller generates in response to the falling edge of signals from the input sensor 3. If the braked wheels are rotating too slowly, the number of clock pulses generated during the period of time required for an input sensor pulse may exceed the ability of the microprocessor to count and produce an inaccurate measurement of the period of time required for the sensor pulse to arrive at the microprocessor. To prevent a too slow vehicle speed from generating inaccurate data to the microprocessor, the algorithm generates an underflow interrupt which indicates that the vehicle is travelling below a predetermined low speed, such as 3 mph. The controller generates underflow subroutine 206 in response to an underflow interrupt. The underflow routine initializes an underflow flag that signals the controller to store the last signal count as the value of the current wheel speed signal.

Independent of the speed at which the vehicle is traveling, the microprocessor generates a periodic interrupt, for example every 15 milliseconds, corresponding to interrupt subroutine 208 of FIG. 4a. The systems algorithm contained in the microprocessor does not update the wheel speed signal used by the control algorithm until receipt of a sensor input pulse generated by the input speed sensor. Once the systems algorithm updates the wheel speed information, however, the control algorithm delays servicing the next sensor interrupt pulse, such as may be produced by the falling edge of wave packets 500 or 501. If the servicing of the updated value for the wheel speed signal were not delayed, the accuracy of the control algorithm could be compromised by a collision between simultaneous attempts of the systems algorithm to enter the updated wheel speed signal into its memory location and of the control algorithm to read that memory location.

Subroutine 210 implements the control program for the antilock system. At 212 the program determines if the zero velocity counter has been on for two interrupt periods. If so, the value of the current velocity signal is arbitrarily set equal to a low, non-zero value such as 2.6 ft/sec to prevent the program from dividing by zero due to an uninitialized variable. Also, an underflow flag is set and the last valid value is maintained as the present value. The count immediately following an underflow count is also ignored because it is presumed that the following count is also part of the underflow condition. Otherwise, the controller stores the measured value from the single sensor as the speed value. An underflow condition means that the state of the brake release means is not changed by the control algorithm.

Referring to FIG. 4b, test 216 determines whether solenoid 7 is activated. If the solenoid is not on (i.e., the brake is applying force), the control system computes a wheel signal speed 100 corresponding to the sensed velocity of the wheel and reference signal 102 as described previously. After determining a bin number for the present velocity, the controller determines as follows whether reference curve 102 should correspond to 0.9 the value of curve 100 or if signal 102 should correspond to the first maximum rate of decrement corresponding with 0.7 g deceleration. Assuming initially that the reference signal corresponds to 0.9 of speed signal 100, the controller calculates the change in wheel velocity from the preceding iteration by subtracting the present value from the preceding value. The controller then tests at point 220 to determine whether the speed of the wheel is increasing. If so, the controller keeps the reference signal at the 0.9 value. However, if the speed of the wheel is decreasing, then the controller determines at 222 whether the reduction in speed corresponds to a deceleration of more than 0.7 g. If not, the program maintains the reference signal at 0.9 of the value of signal 100. If the deceleration is greater than 0.7 g, however, the program forces signal 102 to adopt a linear decrement value corresponding to a 0.7 g rate of deceleration.

The controller determines at 224 of FIG. 4b if the present value of reference signal 102 has dropped below the minimum threshold value 110 (e.g., 5 ft/sec). If so, the controller sets the value of reference signal 102 equal to a value corresponding to the minimum threshold velocity. If the value of curve 102 is above the threshold level, however, the value of the reference curve 102 is not changed.

At point 226 of FIG. 4c the controller again tests to determine whether the solenoid is activated (brake release signal generated). If not, the controller determines at point 228 whether the value of signal 100 exceeds the value of reference signal 102. If it does, the controller cuts off the brake release signal if it is not already off. If, however, the reference velocity signal 102 exceeds signal 100, the controller tests at 230 to determine whether the value of speed signal 100 corresponds to a velocity greater than a second minimum threshold velocity (e.g., 10 ft/sec). If the value of the wheel speed signal is less than the first threshold, the brake release signal is inhibited and full control of the brake is maintained by the operator of the vehicle.

If signal 102 is greater than signal 100 at test 228 and if at test 230 the value of signal 100 corresponds to a velocity greater than the second minimum threshold (10 ft/sec), the controller determines at 232 whether the solenoid turn on indicator has been commanded for at least two successive iterations of the control subroutine. If not, the routine returns to wait loop 202 without activating the solenoid.

Referring to FIG. 4b, if solenoid 5 is activated and releasing pressure from the brake, the program of the control subroutine branches from 216 directly to 224 and computes a reference signal to correspond to a second maximum linear deceleration rate of, for example, 1.0 g. The controller computes both the speed value and value for the reference signal by a bin look-up routine as previously described.

At point 226 of FIG. 4c the program branches to 234 and determines whether the solenoid signal has been on for a preset period, e.g., at least two seconds. If it has, the solenoid signal is turned off, reference signal 102 returns to a curve corresponding to 0.9 of the value of signal 100 and the program resumes wait loop 202. If the solenoid has not been on for two seconds, however, the program proceeds to 236 and determines whether the wheel is on a low traction surface (see the above discussion of the low friction modification). Assuming that the wheel is not, the program proceeds on to test 238 and determines whether the value of signal 100 corresponds with or crosses above reference velocity signal 102.

If the value of speed signal 100 goes above reference velocity signal 102, the controller assumes that the wheel is out of an incipient lock-up condition. The program tests at 240 to determine whether the time P2 that the solenoid signal has been on exceeds the period of the predetermined time constant K. If not, the controller turns off the solenoid signal and returns to the wait loop. If, however, the solenoid signal has been activated for longer than K seconds, the controller concludes that the wheel is operating on a low traction surface and increments a flag to delay up to time period P3 the generation of another solenoid release signal. The program then returns to the wait loop. If, however, the value of signal 100 remains below the reference signal 102 at 238, the controller jumps to 242 and increments a counter indicating the period of time P1 since signal 100 first crossed below reference signal 102 as well as a separate counter indicating the period of time P2 that the solenoid has been on after the speed signal reached threshold 120. Thus, during the next iteration, at point 236 the controller branches to point 244. If the value of signal 100 is above the reference signal 102, the solenoid is deactivated (brake restored). If, however, the value of signal 100 corresponds to a velocity below the first minimum threshold 120 at 246, the program increments counters from both time periods P1 and P2. The program then returns to wait loop 202. If, however, the value of signal 100 is above the value of threshold 110, the program increments only the counter for the period of time P1 that solenoid 7 has been actuated.

The controller operates in real time so that the program need not anticipate the change in the speed of the vehicle. The controller responds to the speed of the vehicle as measured in the last one or two iterations or samples. The rapid rate at which the controller adjusts to changes in the speed of rotation of the wheel guarantees that the difference between the conditions on which the controller is acting and the instantaneous operating conditions of the vehicle does not adversely affect the ability of the system to control the vehicle. The antilock system may adjust to unexpected traction conditions because the controller responds to actual, possibly rapidly changing road conditions rather than anticipated conditions.

One method for the controller to perform computations would be to use signed, floating point double precision multiplication and division routines to compute a response for the antilock system during each iteration from a programmed formula. However, executing a program each iteration of the antilock system is not preferred because, with present microprocessors, each iteration a control program requires too much time. Alternatively, additional processing hardware may be added to increase the processing speed or more powerful microprocessors can be used which is capable of completing the processing within an optimal period of time. Solutions for processing the algorithms that require additional or more expensive hardware needlessly increase the cost of the antilock system without producing a corresponding benefit.

Both speed and reference signals may be determined or computed with a bin look-up routine. Each input speed frequency signal has a corresponding velocity value stored in memory. The controller uses the number of the bin corresponding to the last recorded velocity as the present bin number to find the bin number corresponding to the most recent measured rotational speed. The look up routine reduces the time required for the controller to perform computations. It has been found that the computation routine can be performed quickly enough that the location of a subsequent bin is normally no more than two or three bins away from the location of the previous bin.

The controller chosen to implement the program is preferably a conventional 8-bit microprocessor, such as a 6501Q made by Rockwell International's semiconductor group in Newport Beach, Calif. The program is permanently stored in ROM memory or in external EPROM. Using an eight-bit NMOS microprocessor provides 192 bytes internal RAM and 4K bytes of program memory in external EPROM. The microprocessor contains two internal programmable timer counters and up to 32 input/output ports as well as a programmable serial data port. The input wheel speed signal is connected to the PA0 port of the 6501Q and supplies the "count" window for the wheel speed signal which is found on the PA4 line.

As exemplified above, the look-up table available to the microprocessor contains information on the braking characteristics of the vehicle. The look-up table is preferably a 128 by 4 table with each entry containing two bytes for a total of 1024 bytes in ROM. A separate program may generate binary values for the table. The program for computing the braking function requires accuracy of approximately 12 bits. Thus, an 8 bit microprocessor must make upper and lower byte comparisons to satisfy the precision requirement of the program.

Referring again to FIG. 3(b), if the controller determines for two successive iterations that the solenoid should be activated (brake released), the controller generates a brake release signal to activate the solenoid and release brake force. After the solenoid is actuated, the controller determines the value for the speed of the wheel at the time that the value of speed signal 100 drops below signal 102 and calculates a value for time constant K that corresponds to the measured wheel speed signal as discussed above in the section on the low friction modification. The controller then returns the program to the wait loop 202 until the controller generates another interrupt signal.

It is significant that brake force is not released on the first iteration of the control algorithm indicating that the wheel speed signal 100 has obtained correspondence with the reference velocity signal 102. Transient, high frequency mechanical vibrations set an upper limit to the rate which the control algorithm may iterate. Each iteration of the control algorithm normally requires a jump of no more than two or three bins for each measurement. One might expect that the control algorithm would jump fewer bins with a faster sampling rate. However, after doubling the rate of iteration of the control algorithm from 20 milliseconds to 10 milliseconds, the bins selected in succeeding iterations of the control algorithm often remained as widely separated as at the slower rate of iteration. This effect apparently results from transient, high frequency resonance vibrations in the carrier that distort the duration of the count window of the input wheel speed signal. One may readily contemplate other methods for eliminating the adverse effect of the transient mechanical vibrations on the accuracy of antilock system. One method is to have a separate control algorithm determined the distance of one measurement from the previous measurement and discount the measurement if it required an excessive jump. However, the microprocessor controller of the present invention cannot process an additional special purpose control algorithm without sacrificing the processing speed of the control algorithm.

The principles, preferred embodiment and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered exemplary in nature and not limiting to the scope and spirit of the invention set forth in the appended claims.

What is claimed is:

1. An antilock brake system for a vehicle, comprising:
   a differential gear assembly for transferring power from the engine to wheels of said vehicle, said differential gear assembly having a housing for enclosing said differential gear assembly, said differential gear assembly including a main differential gear;
   a wheel speed sensor mounted adjacent the main differential gear or on a carrier on said main differential gear and on said differential housing to measure the rate of rotation of said main differential gear or carrier on said main differential gear, said gear being beyond the final reduction in gear ratio of said differential gear assembly;
   means for sensing the rate of rotation of said main differential gear or carrier on said main differential gear;
   means for generating a wheel speed input signal indicative of the rate of rotation of said differential gearing;
   digital control means mounted on said housing adjacent said wheel speed sensor for determining an incipient wheel lock condition based on said wheel speed input signal and generating a brake force release signal;
   a brake for applying braking force to the wheels of said vehicle; and
   means for releasing a brake in response to said brake force release signal.

2. The antilock brake system as claimed in claim 1, wherein:
   said one gear is the main differential gear of said differential gear of said vehicle.

3. The antilock brake system as claimed in claim 2, further comprising magnetic elements mounted on said main differential gear.

4. The antilock brake system as claimed in claim 3, wherein said magnetic elements are formed on a separate piece of material that is bolted onto said main differential gear.

5. The antilock brake system as claimed in claim 2, wherein said differential gear assembly is part of a tandem axle assembly.

6. The antilock brake system as claimed in claim 5, wherein said differential gear assembly is connected to an engine driven differential of a tandem axle assembly.

7. The antilock brake system as claimed in claim 5, wherein said differential gear assembly is connected a gear driven differential of a tandem axle assembly.

8. The antilock brake system as claimed in claim 2, wherein said digital control means is positioned on the differential housing.

9. The antilock brake system as claimed in claim 8, wherein said brake release means release braking force from the wheels connected to driven axles extending from said differential gear assembly.

10. A method of operating an antilock brake system for a vehicle, comprising the steps of:

sensing a speed of rotation of the main differential gear or of a carrier on said main differential gear of a main differential gear assembly;

generating a wheel speed signal indicative of said speed of rotation of said main differential gear, said wheel speed signal comprising the average speed of rotation of at least two wheels of said vehicle;

computing a condition of incipient wheel lock from said wheel speed signal;

generating a brake force release signal in response to said incipient wheel lock; and releasing a braking in response to said brake force release signal.

* * * * *